US008249869B2

(12) United States Patent
Vessiere et al.

(10) Patent No.: US 8,249,869 B2
(45) Date of Patent: Aug. 21, 2012

(54) LEXICAL CORRECTION OF ERRONEOUS TEXT BY TRANSFORMATION INTO A VOICE MESSAGE

(75) Inventors: Gilles Vessiere, Vassel (FR); Joël Bachelerie, Saint Ferreol des Cotes (FR)

(73) Assignee: Logolexie, Aubiere (FR)

( * ) Notice: Subject to any disclaimer, the term of this patent is extended or adjusted under 35 U.S.C. 154(b) by 394 days.

(21) Appl. No.: 12/308,378

(22) PCT Filed: Jun. 15, 2007

(86) PCT No.: PCT/FR2007/001001
§ 371 (c)(1),
(2), (4) Date: Jun. 18, 2009

(87) PCT Pub. No.: WO2007/144519
PCT Pub. Date: Dec. 21, 2007

(65) Prior Publication Data
US 2010/0161312 A1    Jun. 24, 2010

(30) Foreign Application Priority Data

Jun. 16, 2006 (FR) ..................... 06 05378

(51) Int. Cl.
*G10L 15/26* (2006.01)
*G10L 13/08* (2006.01)
(52) U.S. Cl. .............. 704/235; 704/266; 704/270
(58) Field of Classification Search .......... 704/231, 704/234, 235, 246, 250, 258, 260, 261, 266, 704/270
See application file for complete search history.

(56) References Cited

U.S. PATENT DOCUMENTS

| 6,477,493 | B1 * | 11/2002 | Brooks et al. .................. 704/246 |
| 6,618,697 | B1 * | 9/2003 | Kantrowitz et al. ............ 703/22 |
| 6,678,409 | B1 * | 1/2004 | Wu et al. ........................ 382/177 |
| 6,834,264 | B2 * | 12/2004 | Lucas et al. .................... 704/235 |
| 6,859,774 | B2 * | 2/2005 | Mangu et al. .................. 704/255 |
| 6,952,674 | B2 * | 10/2005 | Forand ........................... 704/243 |
| 6,970,820 | B2 * | 11/2005 | Junqua et al. ................. 704/258 |
| 7,181,392 | B2 * | 2/2007 | Gandhi et al. ................ 704/235 |
| 7,200,555 | B1 * | 4/2007 | Ballard et al. ................ 704/235 |

(Continued)

FOREIGN PATENT DOCUMENTS
EP    1321926    6/2003
(Continued)

OTHER PUBLICATIONS

"Read & Write v7.1 Gold, Beginners Guide Quick Start" [Online] 2005, Texthelp Systems Ltd, XP002425736, url:http://www.texthelp.com/webfiles/RWGv7.1%20Beginners%20Guide.pdf, retrieved Mar. 19, 2007.

(Continued)

*Primary Examiner* — Martin Lerner
(74) *Attorney, Agent, or Firm* — Thomas & Karceski, PC

(57) ABSTRACT

The method is suitable for dysorthographic or partially sighted persons, to facilitate the semantic, syntactic and/or lexical correction of an erroneous expression in a digital text input by a user. The method comprises the sequence of: a step (74) of transforming the digital text into a digital voice message, in which the graphemes of the erroneous textual expression are converted into phoneme(s) constituting an intelligible vocal expression, then a step (78) of processing the digital voice message obtained at the end of the transformation step (74), in which the phoneme or phonemes constituting the intelligible vocal expression are converted into grapheme(s) constituting a corrected textual expression of the erroneous textual expression, with the aid of pre-established writing rules.

8 Claims, 1 Drawing Sheet

U.S. PATENT DOCUMENTS

| | | | |
|---|---|---|---|
| 7,206,738 B2* | 4/2007 | Rajput et al. | 704/10 |
| 7,260,534 B2* | 8/2007 | Gandhi et al. | 704/270 |
| 7,412,387 B2* | 8/2008 | Faisman et al. | 704/257 |
| 7,444,286 B2* | 10/2008 | Roth et al. | 704/270 |
| 7,577,569 B2* | 8/2009 | Roth et al. | 704/260 |
| 7,617,106 B2* | 11/2009 | Schramm | 704/270 |
| 7,668,718 B2* | 2/2010 | Kahn et al. | 704/270 |
| 7,689,416 B1* | 3/2010 | Poirier | 704/235 |
| 7,693,717 B2* | 4/2010 | Kahn et al. | 704/260 |
| 8,041,566 B2* | 10/2011 | Peters et al. | 704/236 |
| 2001/0044724 A1* | 11/2001 | Hon et al. | 704/260 |
| 2003/0033146 A1* | 2/2003 | Morin et al. | 704/251 |
| 2006/0149546 A1* | 7/2006 | Runge et al. | 704/246 |
| 2006/0161434 A1* | 7/2006 | Faisman et al. | 704/246 |
| 2006/0190249 A1* | 8/2006 | Kahn et al. | 704/235 |
| 2007/0016421 A1* | 1/2007 | Nurminen et al. | 704/260 |
| 2007/0208570 A1* | 9/2007 | Bhardwaj et al. | 704/270.1 |
| 2007/0244702 A1* | 10/2007 | Kahn et al. | 704/260 |
| 2007/0299664 A1* | 12/2007 | Peters et al. | 704/235 |

FOREIGN PATENT DOCUMENTS

GB     2343037     4/2000

OTHER PUBLICATIONS

Abi, James: "Technology Overview", [Online], Oct. 2005, Ianstyst Ltd., XP002425737 URL:http://www.dyslexic.com/articlecontent.asp?posttile=technology%200verview&slug=/technology/overview/, retrieved Mar. 19, 2007.

Gregor et al., "An empirical investigation of ways in which some of the problems encountered by some dyslexics may be alleviated using computer techniques", Nov. 12, 2000, The Fourth Int'l ACM Conf on Assistive Technol, Arlington VA Nov. 13-15, 2000, Int'l ACM Conf on Assistive Technol, New York, NY, pp. 85-91.

"TextHELP Read & Write 7.1 Gold, Product Review", [Online], Mar. 13, 2005, Spectronics, XP002425738, URL:http://web.archive.org/web/20050313151923/http://www.spectronicsinoz.com/browse.asp?cat=11002, retrieved Mar. 20, 2007.

* cited by examiner

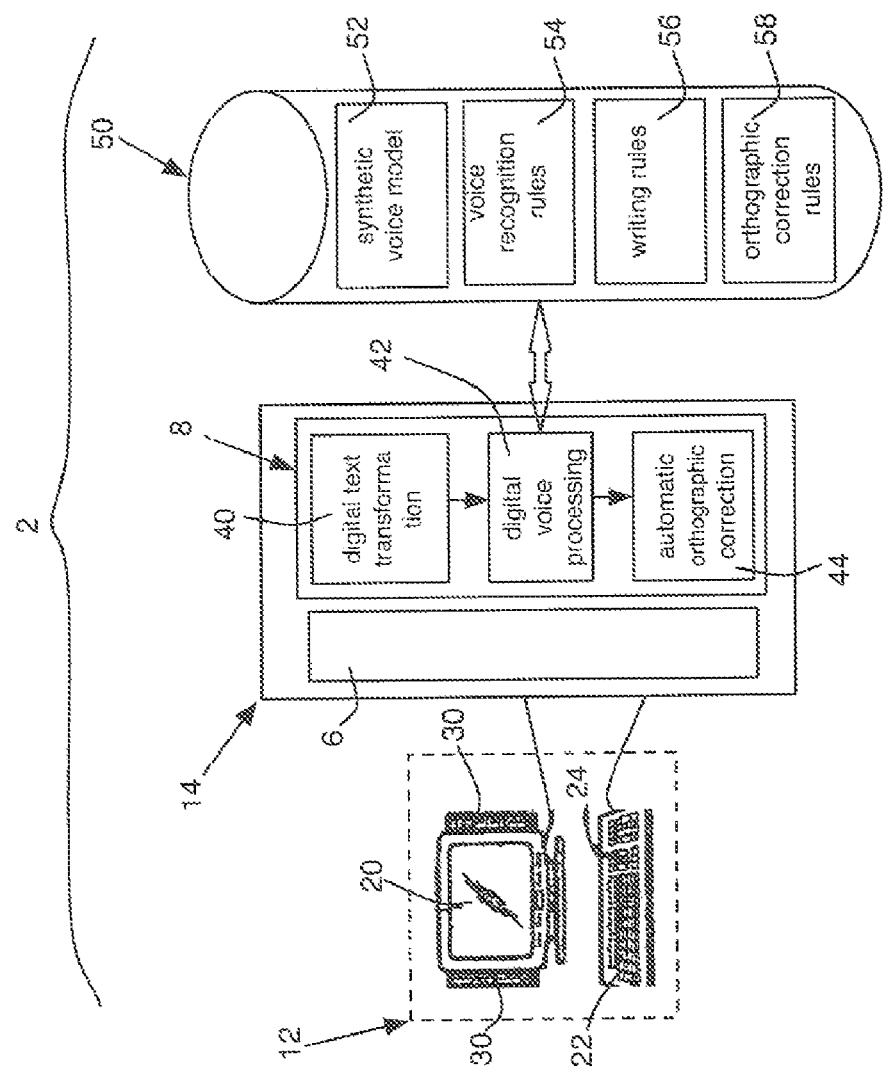
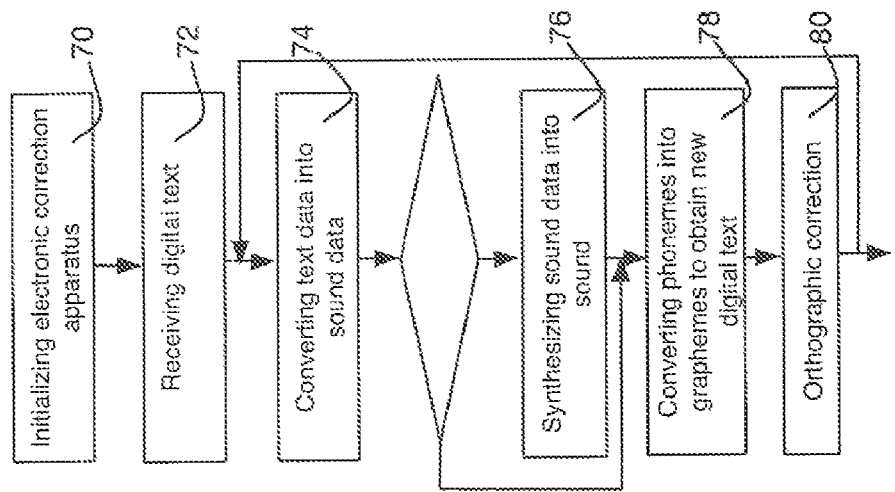

LEXICAL CORRECTION OF ERRONEOUS TEXT BY TRANSFORMATION INTO A VOICE MESSAGE

CROSS-REFERENCE TO RELATED APPLICATIONS(S)

This is a United States National Stage Patent Application that relies for priority on PCT Patent Application Serial No. PCT/FR2007/001001, which was filed on Jun. 15, 2007, and on French Patent Application Serial No. 0605378, filed on Jun. 16, 2006.

FIELD OF THE INVENTION

The present invention relates to a semantic, syntactic and/or lexical electronic corrector for facilitating the semantic and/or syntactic and/or lexical correction of an erroneous expression in a digital text. The invention also relates to a corresponding correction method, as well as a recording medium and a computer program for implementing this method. The invention thus comes within the field of automatic natural language processing (ANLP).

DESCRIPTION OF THE RELATED ART

Here, the term "digital" is understood in its broad sense as the fields of computing and electronics, that is to say denotes an information object which can be produced, stored and/or processed in binary form. Likewise, here, the term "expression" is used to denote either a word, a group of words in a sentence or a whole sentence or, more generally, any graphical linguistic element, such as a numeral or a pictogram, associated with a vocal or sound version.

Today there are numerous syntactic correctors associated with various existing pieces of text processing software. One of the best known of these correctors is, for example, that used in the Microsoft® Word text processor. Typically, this type of corrector automatically detects an erroneous expression and proposes one or more expressions that may be used to correct the erroneous expression. The user validates the appropriate correction and the correct expression replaces the erroneous expression.

This type of corrector is practical and suitable for most users. Nevertheless, such correctors are not easy to use for a person who is dysorthographic, in particular dyslexic or partially sighted, or indeed blind. Specifically, these people have significant difficulties in writing and in reading the corrected expressions proposed by the corrector, so that it is tricky, or indeed impossible, for them to correct the erroneous expression in an appropriate manner.

The difficulties encountered by dyslexic people can nevertheless be overcome in part through the use of computerization, as mentioned in the article "An empirical investigation of ways in which some of the problems encountered by some dyslexics may be alleviated using computer techniques" (P. Gregor et al., 13 Nov. 2000, the fourth international ACM conference on assistive technologies). Thus, in the article "Technology Overview", the Read & Write GOLD software, is presented as suitable for dyslexics in the sense that this software includes various tools, in the form of mutually independent sub-programs, facilitating writing and reading for these people. In particular, this software includes a tool "text-to-speech", which makes it possible to transform a digital text, in particular an input text of the MS Word type, into a voice message for the attention of a user. Stated otherwise, this "text-to-speech" tool allows a computer to "read aloud" a digital document. Another tool, independent of the above, consists of a phonetic spellchecker, which makes it possible to correct the spelling of an input text of the MS Word type. An example of this kind of phonetic spellchecker is presented in greater detail in GB-A-2 343 037: this software splits a digital word into clusters of letter(s) and then associates, with the aid of a base of pre-established rules, each of these clusters with conceivable pronunciations. These various pronunciations are thereafter processed with the aid of a pronunciation dictionary, to establish a list of possible spellings for the word.

The currently available tools thus afford dyslexics some aid. Nevertheless, these tools present significant limitations, in the sense that their method of operation processes inputs at a textual level only, essentially only for words considered in isolation, thus presupposing that their users suffer from moderate or already highly corrected dyslexia. Thus, these tools are not especially suitable for all dysorthographic people and even less for illiterate people or those suffering from a severe communication handicap, congenital or following an accident.

SUMMARY OF THE INVENTION

The aim of the present invention is therefore to propose a correction method and a corresponding corrector, which are effective for a wide public of people suffering from reading and writing disorders.

For this purpose, the subject of the invention is a method of semantic, syntactic and/or lexical correction of an erroneous expression in a digital text. The subject of the invention is also a semantic, syntactic and/or lexical electronic corrector for facilitating the semantic and/or syntactic and/or lexical correction of an erroneous expression in a digital text.

In the present document, the term "phoneme" denotes, broadly, linguistic phonic elements, either elementary, or associated with other phonic elements to form articulated phonemes, in a prefixed or suffixed manner, or to form diphonemes, or indeed triphonemes or triphones.

Unlike the known correctors, which correct an erroneous textual expression by way of modules for direct processing of digital text, the method and the manner of operation of the corrector in accordance with the invention relies on the use of a digital voice message, obtained by the conversion of the digital text with error by the transformation module and thereafter used to provide a text without error by way of the processing module. Stated otherwise, rather than directly processing the digital text containing the erroneous expression, the idea underlying the invention is to process this text in an indirect manner, that is to say by way of a digital voice message, it being noted that, even though the initial digital text contains semantic, syntactic and/or lexical errors, the phonemes of this digital voice message form a vocal version of the text that is stripped of phonetic error, which is then processed to provide the corrected digital text, with the aid of the writing rule base associated with the processing module. Thus, even a dysorthographic person, such as a dyslexic person or a partially-sighted person, can easily and effectively correct a text that they have previously input digitally.

Specifically, by utilizing the characteristics of spoken language, which render it independent of the use of the rules which govern writing, automatic speech processing means, on which the invention relies, allow this effective correction, even for people suffering from significant reading and writing disorders. The spoken language processing technologies upon which the invention calls, rely on the use of a series of events which offer the smallest, but sufficient, representation of an expression, such as words, letters, numerals, punctuations, etc. These events are essentially phonemes, within the general sense defined above, so that, in the guise of speech element, a text can be considered to be a series of phonemes linked without discontinuity. This is true both in regard to a word and to a sentence. Stated otherwise, an element of a word, for example a letter, is then not identified at the vocal level in the guise of an isolated unit, but it is identified in indivisible relation to the word element which precedes it and/or the word element which follows it, and/or finally in relation to the set of word elements to which it belongs. Automatic speech processing thus offers remarkable subtlety, capable of differentiating one speech element from another, however small it is. In regard to this aspect, when the method according to the invention is applied to a word, the accuracy of this method is explained by the accurate identification of each element constituting this word, with the aid of phonemes in the broad sense, by using acoustic elements and statistics algorithms. In particular, it is thus possible to differentiate, in a very subtle manner, a phoneme and also to provide, with the aid of statistical models, the prefix and suffix coarticulation of this phoneme. In practice, the automatic speech processing means underlying the invention are capable of discriminating between several possible competitors for one and the same letter, based on comparing acoustic signals of low dimensions, to which is advantageously added a comparison of associated electrical signals. Thus, the choice between two possible solutions for one and the same letter is much more efficacious with the aid of such means of natural language processing than with the aid of techniques for comparing clusters of letter(s), as envisaged in the phonetic spellcheckers mentioned above, in particular of the type of that proposed in GB-A-2 343 037.

The fact that the method according to the invention processes a text at the vocal level, that is to say at the spoken language level, therefore makes it possible to circumvent the discontinuity of the words in a sentence. Another advantageous aspect of going via the vocal level is that the user can write a word in an incorrect manner, the pronunciation of which does not have to be rigorously exact, in the sense that identification by modifying the prosody, obtained by appropriate natural language processing means, makes it possible to correct the pronunciation error.

Another advantage of the method according to the invention is related to its ability to correct a wrong sentence consisting of right words, that is to say an intelligible sentence consisting of a series of words that are correct at the lexical level but inconsistent at the syntactic and/or semantic level. Specifically, when this kind of sentence is processed by a phonetic spellchecker, each word considered in isolation does not require any correction, although the sentence taken as a whole makes no sense at the textual level, although it does have one at the spoken language level. It may be noted moreover that, by going via the spoken language, in accordance with the invention, it is made possible to correct the use, in a digital text, of numbers or of numerals replacing sounds, in particular within a word, since these numbers or these numerals are then not considered to be mathematical elements, but acoustic elements. The same considerations apply to abbreviations of the kind of those currently encountered in SMS-type messages, as well as to pictograms insofar as the latter can be vocalized in an unequivocal manner.

Yet another advantage of the method and of the corrector according to the invention, in particular by comparison with phonetic spellcheckers, is the ease with which new languages can be taken into account, through, on the one hand, appropriate adjustment of the transformation module so that the latter can transform in an optimal manner a digital text into a digital voice message in a given new language, and, on the other hand, appropriate adjustment of the processing module so that the latter can convert the digital voice message into a digital text in this new language.

Other characteristics of the method of correction and of the corrector according to the invention, taken in isolation or in accordance with all the technically possible combinations, are discussed herein.

The subject of the invention is furthermore an information recording medium and a computer program.

BRIEF DESCRIPTION OF THE DRAWINGS

The invention will be better understood on reading the description which follows, given solely by way of example while referring to the drawings in which:

FIG. 1 is a diagram illustrating a correction system in accordance with the invention, and FIG. 2 is a flowchart of a correction method in accordance with the invention.

DETAILED DESCRIPTION OF EMBODIMENT(S) OF THE INVENTION

FIG. 1 represents a semantic, syntactic and lexical correction system, denoted by the general reference 2. The system 2 is embodied here, by way of example, on the basis of a conventional computer equipped with conventional text processing software 6 and a semantic, syntactic and lexical corrector 8.

The text processing software 6 here forms an example of a means for acquiring a complete typewritten digital text, to be corrected. This complete text is formed of a succession of expressions.

The computer comprises a man/machine interface 12 associated with a central unit 14, formed on the basis of a conventional programmable electronic computer, able to execute the text processing software 6. The interface 12 comprises, inter alia:

a video screen 20,
 a keyboard 22 equipped with a key 24 for activating a processing module belonging to the corrector 8, and
 loudspeakers 30 or similar.

The corrector 8 is able to correct erroneous expressions acquired with the aid of the software 6. For this purpose, this corrector comprises:

a module 40 for transforming a digital text into a digital voice message, able to convert the graphemes of the text, that is to say its textual elements, into phonemes, that is to say into sound elements, such as vowels, consonants, diphthongs, etc, the set of these phonemes constituting an intelligible vocal version of the text;
 a module 42 for processing a digital voice message, able to convert the phonemes of the message into graphemes to form a digital text constituting a readable textual version of the voice message; and
 a module 44 for automatic orthographic correction of a digital text.

These modules 40, 42 and 44 are designed to operate "in series" within the corrector 8 which comprises for this purpose ad hoc electronic means of transmission between these modules.

To convert a digital text, such as a typewritten text, into a digital voice message, and vice-versa, the modules 40 and 42 use known techniques, such as those described in "La parole et son traitement automatique" [Speech and its automatic processing], Tubach J P. et al, 1989, published by Masson, Paris, or in the reference works by J. P. Haton. As explained above, these automatic spoken language processing techniques make it possible to identify a written word element as an acoustic signal, and also optionally as an electrical signal, in phoneme form in the broad sense, in particular triphone form.

A memory 50 is associated with the central unit 14. This memory 50 comprises:

- a pre-established base 52 of a synthetic voice model; this base 52 is intended to be used by the module 40 to provide phonemes exhibiting a predetermined vocal profile, likened in practice to a synthetic voice;
- a base 54 of voice recognition rules; this base 54 is intended to be used by the module 42 to facilitate the identification of the phonemes to be converted, with the aid of the rules of the base;
- a pre-established base 56 of writing rules; this base 56 is intended to be used by the module 42 to provide correct textual expressions from phonemes; and
- a pre-established base 58 of rules of orthographic correction, intended to be used by the module 44.

Advantageously, the bases 56 and 58 are each divided into two parts, a first part comprising the rules suitable for any type of user, while a second part comprises rules specially established for a given user of the corrector 8, associated with an identifier.

Here, the corrector 8 is embodied in the form of a computer program executable by the electronic processor of the central unit 14. For this purpose, the memory 50 also comprises instructions for executing the method illustrated in FIG. 2, as well as variants of this method.

An example of the manner of operation of the system 2 will now be described with regard to the method of FIG. 2.

Initially, during a step 70 of initializing the corrector 8, a given user identifies himself to the corrector. Depending on this user, the corrector selects, during the same step, the second parts of the corresponding bases 56 and 58 to be used.

The user thereafter inputs a text with the aid of the keyboard 22. This text is acquired, during a step 72, by the software 6 in the form of a digital typewritten text. By way of example, the text acquired is "Je bois delo", it being noted that the expression "delo" is obviously erroneous in the context of this text.

Once the complete text to be corrected has been acquired by the software 6, the module 40 transforms it into a digital voice message during a step 74, by converting the graphemes of the text, in particular that of the erroneous textual expression "delo", into phonemes. In practice, step 72 provides a digital set of textual information data representative of the digital text with the erroneous expression "delo", while, during step 74, this digital set of textual information data is converted, by the module 40, into a digital set of vocal information data representative of the phonemes associated with the graphemes of the digital text, including the phonemes constituting the vocal expression of the erroneous textual expression "delo". Specifically, at the end of step 72, we have a digital text file, while at the end of step 74, the module 40 provides a digital sound file.

During step 74, the module 40 advantageously uses the base 52 to provide the phonemes according to the synthetic voice model.

Advantageously, the digital voice message provided by the module 40 is dispatched to the loudspeaker 30 which, during an optional step 76, synthesizes this voice message as audible sounds for the user. The latter thus hears the vocal version of the text that he has typed, after its transformation by the module 40. The user can then verify the phonetic accuracy of the synthesized voice message, it being noted that, although the user has input an erroneous textual expression, the synthesized voice message turns out to be accurate from a sound point of view.

In so far as the user is satisfied with the sound version of the text that he has input in step 72, he depresses the key 24.

Either automatically at the end of step 74 if step 76 is not implemented, or in response to the depression of the key 24, the module 42 is activated and, during a step 78, this module 42 processes the digital voice message provided by the module 40. During this step 78, the phonemes of the digital voice message are converted into graphemes to form a corresponding digital text, that may be referred to as the "reconstituted text" and which is devoid of error in the sense that this text is written by the module 42 with the aid of the writing rules of the base 56. Thus, the module 42 converts the phonemes of the aforesaid example into "Je bois de l'eau", it being noted that the textual expression "de l'eau" is correct in the context of the sentence and thus constitutes the corrected expression of the erroneous expression "delo".

In practice, during step 78, the vocal information digital data set provided in step 74, specifically the sound file, is converted into a digital set of textual information data representative of the digital text, specifically a text file, with the textual expression "delo" corrected to "de l'eau".

During step 78, if the base 52 has been used in step 74, the processing of the digital voice message by the module 42 is advantageously improved significantly by using the base 54: the module 42 then easily identifies the phonemes to be converted with the aid of the recognition rules of the base 54. In practice, these recognition rules have, during training operations prior to step 70, been established as a function of the synthetic voice model used by the module 40. During step 78, the processing module 42 thus utilizes a voice message which is, as it were, "dictated" by the synthetic voice that it recognizes.

On completion of step 78, the corrector 8 undertakes an optional step 80 of orthographic correction, by way of the module 44 using the base 58. During this step 80, the text provided by the module 42 is processed so as to correct any residual spelling mistakes.

If necessary, depending on the user's wishes, steps 74 to 80 can be repeated for the digital text provided on completion of step 80, for example for checking and verification purposes, or else the user inputs a new text and repeats steps 72 to 80 for the new input text.

As a variant, not represented, the processing of the digital voice message by the module 42 can lead to the obtaining of two, or indeed more, mutually differing digital texts when several possibilities of correction are conceivable. In this case, these digital texts are advantageously vocalized by the module 40, so as to obtain as many digital voice messages from among which will be identified by sound comparison the message closest to the message provided at the end of step 74, by virtue of an appropriate automatic sound comparison module. Another possibility consists in letting the user carry out this sound comparison himself, by making provision for the digital voice message provided in step 74 and the various digital voice messages mentioned above to be synthesized by the loudspeaker 30. It will be noted that the fact of being able to listen to these various voice messages allows the user to correct himself, with measurable remediation effects or pedagogic effects.

Thus, the corrections afforded by the invention rely essentially on the processing of a digital voice message, thereby rendering the invention within the reach of the dysorthographic, partially sighted, illiterate or those afflicted with a communication handicap. More generally, it is understood that the corrector and the method according to the invention can be integrated into all communication interfaces for which one wishes to correct a textual expression which is expected to be erroneous.

To properly appreciate the effectiveness of the method in accordance with the invention, consideration may be given to the following expression to be corrected: "Bon jour, ile faux champs thé dents lait blés. J'ai me 100 tire l'art ose. Ja temps de thé nous vêle."

In practice, this expression is input and corrected by the system 2, following steps 70 to 80 such as described above. On completion of these steps, the corrected expression provided by the system is the following "Bon jour, il faut chanter dans les blés. J'aime sentir la rose. J'attends de tes nouvelles."

Another exemplary expression to be corrected by the system 2 is "le lit vre de gra maire". By virtue of the automatic spoken language processing on which the operation of the modules 40 and 42 relies, the correction by the method in accordance with the invention produces the corrected expression "le livre de grammaire". If one attempted to correct this erroneous expression while remaining at a textual level, that is to say by processing clusters of letters, several correction possibilities ought to be envisaged: "le libre de grand-mèmre", "le livre du Grand Maire", "le lit vert de grand-mère" and all possible combinations.

Additionally, the correction system can be independent of the user's language and is not related to the nature of the text/voice message conversion.

Diverse developments and variants of the corrector and correction method described above may additionally be envisaged:
  the transformation module 40 can be designed to segment the digital voice message that it provides, into words or groups of words, with the aid of a pre-established base of segmentation rules; in this way, the checking of the voice message thus segmented during its sound synthesis in step 76 is thereby facilitated, as is the processing of this voice message by the module 42 during step 78;
  software other than the text processing software 6 can be used to edit the text dispatched to the module 40, for example electronic messaging software, translation software, etc.;
  the base 54 can include a part specially associated with a user, with voice recognition rules obtained on completion of prior modeling operations, with the aid of this user's voice; this possibility turns out to be beneficial when the user expresses himself with a strong prosodic deformation; starting from the principle that the user will submit expressions to the corrector that are written in the same manner in which he expresses himself verbally, better results in terms of correction are obtained;
  rather than providing a semantic, syntactic and lexical corrector, the invention is applicable to a corrector suitable solely for correcting one or more types of errors chosen from the set composed of semantic, syntactic or lexical errors; and/or
  the textual elements processed by the invention are not limited to letters, but may be numerals, symbols, pictograms, etc., as long as these elements are associated with linguistic sound or vocal versions; in this regard, it is conceivable to define a "minimal" writing, for example for sub-titling live pictures, the texts of which will be able to be processed by the method according to the invention in order to obtain texts coming within normal writing.

What is claimed is:

1. A method of semantic, syntactic and/or lexical correction of an erroneous expression in a digital text, comprising:
  using a computer, transforming a digital text comprising eventual erroneous textual expressions into a digital voice message, in which at least one grapheme of the digital text comprising eventual erroneous textual expressions is converted into at least one phoneme comprising an intelligible vocal expression of the entire digital text, including any erroneous textual expressions,
  using the computer and pre-established writing rules, processing the digital voice message obtained at the transformation step, in which the at least one phoneme comprising the intelligible vocal expression is converted into at least one grapheme comprising a new digital text in which any erroneous textual expression is corrected,
  during the transformation step, providing the at least one phoneme according to a predetermined voice model, with the aid of a voice model base, and
  during, the processing step, identifying the at least one phoneme to be converted, with the aid of a base of recognition rules for the predetermined voice model.

2. The method as claimed in claim 1, further comprising:
  before the transformation step, using the computer, providing a digital set of textual information data representative of the digital text with the erroneous expression,
  wherein the transformation step comprises converting the set of textual information data into a digital set of vocal information data representative of the at least one phoneme associated with the at least one grapheme of the digital text, including the at least one phoneme comprising the intelligible vocal expression, and
  wherein the processing step comprises converting the vocal information data provided by the conversion operation of the transformation step, into a digital set of textual information data representative of a reconstituted digital text including the corrected textual expression.

3. The method of claim 1, further comprising, between the transformation step and the processing step, using the computer for synthesizing the sound of the digital voice message obtained at the transformation step, at the end of which synthesis step the digital voice message to be processed during the processing step is validated.

4. A semantic, syntactic and/or lexical electronic correction apparatus for facilitating the semantic and/or syntactic and/or lexical correction of an erroneous expression in a digital text comprising eventual erroneous textual expressions, comprising:
  a module using a computer for transforming the entire digital text into a digital voice message, the transformation module being able to convert at least one grapheme of the digital text comprising eventual erroneous textual expressions into at least one phoneme comprising an intelligible vocal expression of the entire digital text, including any erroneous textual expression, and
  a module using the computer and a pre-established base of writing rules for processing the digital voice message provided by the transformation module, the processing module being able to convert the at least one phoneme comprising the intelligible vocal expression and provided by the transformation module, into at least one grapheme comprising a new digital text in which any erroneous textual expression is corrected,
  wherein the transformation module uses the computer to provide the at least one phoneme according to a predetermined voice model, with the aid of a voice model base, and wherein the processing module is able to identify the at least one phoneme to be converted, with the aid of a base of recognition rules for the predetermined voice model.

5. The electronic correction apparatus of claim 4, further comprising:
   at least one loudspeaker able to synthesize as audible sounds the digital voice message provided by the transformation module, and
   an activation device for activating the processing module so as to apply the processing module to the digital voice message synthesized by the loudspeaker.

6. The electronic correction apparatus of claim 4, wherein the transformation module uses the computer to segment the digital voice message into at least one word, with the aid of a pre-established base of segmentation rules.

7. The electronic correction apparatus of claim 4, further including a module using a computer for automatic orthographic correction of the corrected textual expression provided by the processing module.

8. A computer program embodied in an information recording medium, comprising instructions for executing a correction method when the instructions are executed by a computer, the method comprising:

using the computer, transforming a digital text comprising eventual erroneous textual expressions into a digital voice message, in which at least one grapheme of the digital text comprising eventual erroneous textual expressions is converted into at least one phoneme comprising an intelligible vocal expression of the entire digital text, including any erroneous textual expression, and using the computer and pre-established writing rules; processing the digital voice message obtained at the transformation step, in which the at least one phoneme comprising the intelligible vocal expression is converted into at least one grapheme comprising a new digital text in which any erroneous textual expression is corrected, during the transformation step, providing the at least one phoneme according to a predetermined voice model with the aid of a voice model base, and during the processing step, identifying the at least one phoneme to be converted, with the aid of a base of recognition rules for the predetermined voice model.

* * * * *